Feb. 15, 1966   L. K. WANLASS   3,235,816
SHOCK-WAVE GAS IONIZATION PUMPED LASER DEVICE
Filed June 25, 1962   2 Sheets-Sheet 1
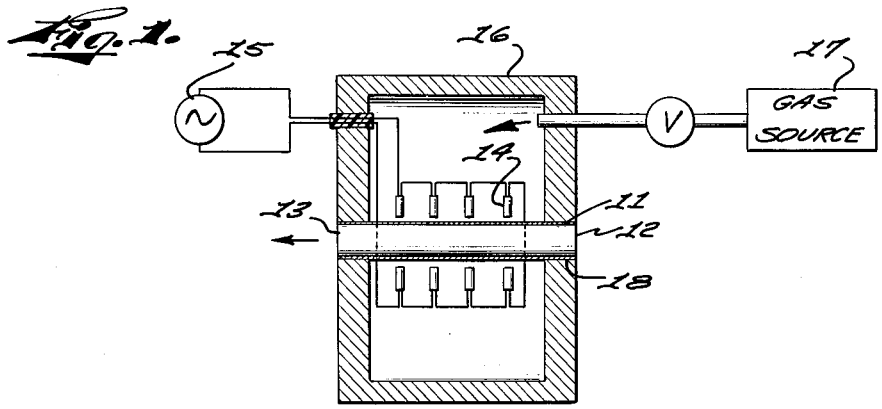
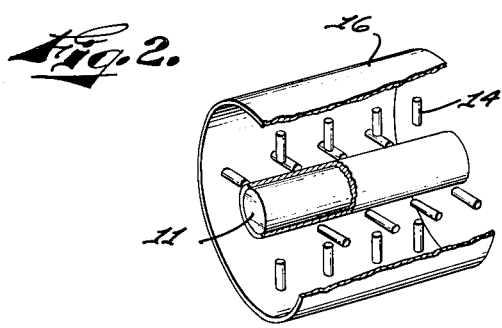
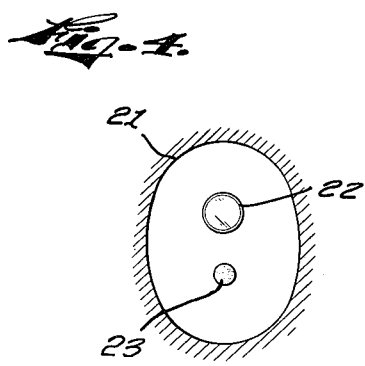
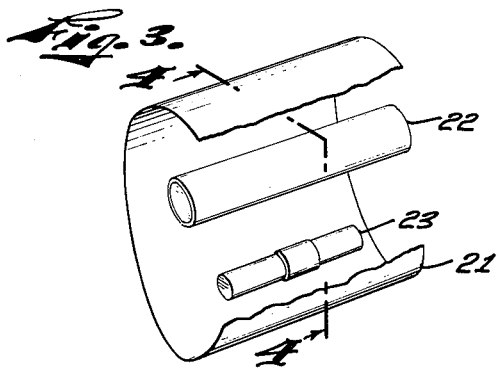
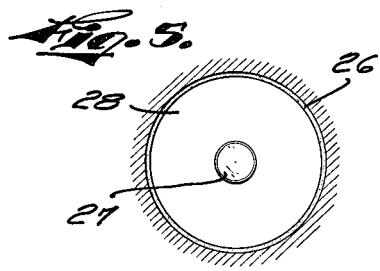
INVENTOR.
L. KENT WANLASS
BY John R. Faulkner
John A. Duffy
ATTORNEYS Feb. 15, 1966 L. K. WANLASS 3,235,816
SHOCK-WAVE GAS IONIZATION PUMPED LASER DEVICE
Filed June 25, 1962 2 Sheets-Sheet 2
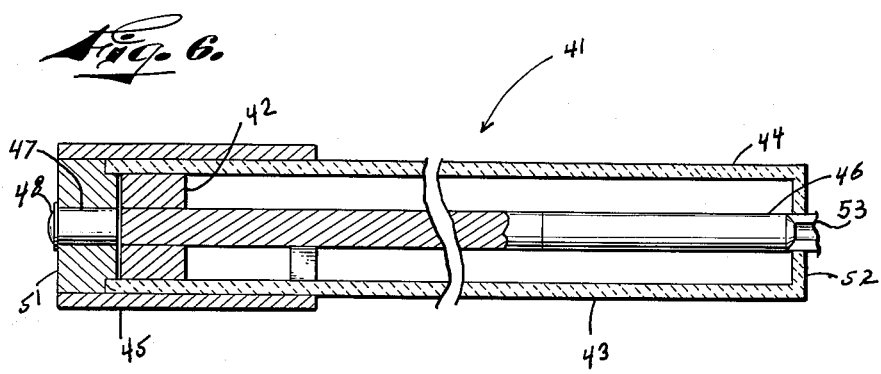
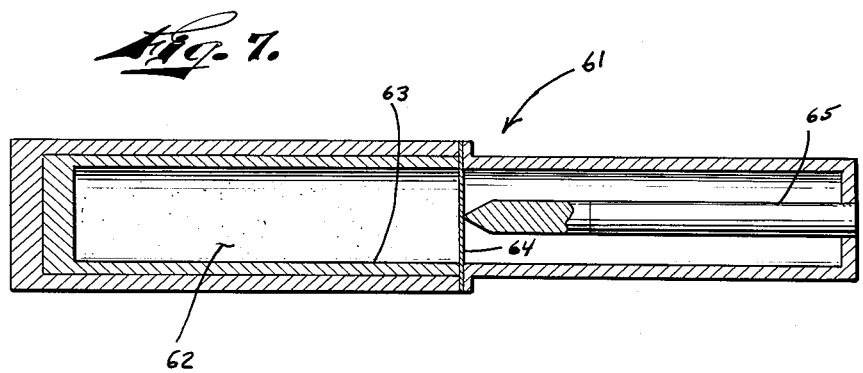
INVENTOR.
L. KENT WANLASS

United States Patent Office 3,235,816
Patented Feb. 15, 1966

3,235,816
SHOCK-WAVE GAS IONIZATION PUMPED LASER DEVICE
Leslie Kent Wanlass, Newport Beach, Calif., assignor to Ford Motor Company, Dearborn, Mich., a corporation of Delaware
Filed June 25, 1962, Ser. No. 204,997
1 Claim. (Cl. 331—94.5)

This invention relates to lasers and more particularly to devices for pumping lasers to obtain higher level energy outputs.

An optical maser, or laser, provides a coherent light output beam of highly parallel light rays which are capable of traveling over extreme distances with little divergence. The operation of a laser is based on the extension of maser principles to permit operation in the light spectrum. The laser transforms broadband energy into energy of a single spectral line making it possible to obtain coherent light. Laser operation requires an active material that will produce stimulated emission of radiation, an excitation source that pumps power into the active material, and a resonant structure. The active material, a ruby rod for example, is constructed so that light eradiated by photons of the active material stimulates more photons to eradiate and intensify the light. Emitted photons trigger additional ions to emit photons in phase with the emitted photon. This instep radiation causes the individual radiations of photons to radiate their energy in phase, that is, coherently. The resonant features of the optical cavity of the active material cause the light radiated to be reflected back into the material many times. This light being of a natural frequency of the active material stimulates more photons to radiate and thereby intensify the light. Due to the amplification caused by the photons stimulating the emission of other photons of the same wavelength, rays comprising photons of the strongest wavelength become predominant over other wavelength rays. This action makes the laser output monochromatic.

Lasers which are developed for use in high power devices require efficient and high energy output pumping sources. Since the active material requires concentrated light energy, the pumping source must provide a high intensity pulse of light. In many applications where space and weight parameters are critical, the pumping source of a laser is required to be as small and light as possible while still providing the necessary high excitation energy for the active material.

Present day pumping sources for lasers utilize a source of electrical power to generate optical pumping radiation for the active material. The means for converting the electrical energy to light energy suitable for pumping the laser material usually takes the form of a flash tube or the like which provides a high intensity light source upon receipt of an electrical pulse. Since available sources of electrical energy such as batteries and alternating current generators do not provide a high voltage source, high energy storage devices such as capacitor banks are required to store electrical energy at high potentials to excite the flash tube which provide the light energy to the active material. High voltage output capacitor banks are necessarily large and cumbersome, and inefficient. Thus, the size of the pumping source requires the laser to be operated in an environment where space and weight are not critical. Additionally, the requirement of high energy light source necessitates the generation of electrical potentials in the kilovolt range which, in turn, complicates the design to protect personnel and prevent leakage of high voltage. Accordingly, it is an object of this invention to provide an improved pumping source for a laser.

The device of the present invention provides a high intensity light source for pumping the laser material without the use of electrical energy. A high power, efficient source of energy is provided which directly produces light energy for pumping the laser material. Large and cumbersome capacitor circuits for storing electrical energy are not needed and no means are required for handling extremely high electrical potentials. A small and lightweight pumping source is realized which significantly contributes to the reduction in size and weight of the entire laser structure making possible applications in the air and on the ground heretofore not known in the art.

It is, therefore, another object of this invention to provide a pumping source for a laser devoid of electrical energy excitation.

It is a further object of this invention to provide an improved pumping source for a laser.

It is still another object of this invention to provide a chemical pumping source for a laser.

Other objects of invention will become apparent from the following description read in conjunction with the accompanying drawings, in which:

FIG. 1 is a sectional view partly in schematic of a laser device embodying the principles of this invention, FIG. 2 is a perspective view of the laser device of FIG. 1, FIG. 3 is a perspective view of a laser device according to an aspect of the invention in which an elliptical configuration is utilized, FIG. 4 is a sectional view of the elliptical laser device of FIG. 3, FIG. 5 is a sectional view of another aspect of the invention in which an explosively produced plasma is utilized as the light source, FIG. 6 is a sectional view of a laser according to another aspect of the invention in which the light source is generated by an explosive, and FIG. 7 is a sectional view of a laser showing another way of explosively generating a light source.

According to a material aspect of the invention, a system is provided for the amplification of light by stimulated emission of radiation. An active material capable of producing stimulated emission of radiation is suitably disposed in a chamber with the active material characterized by having at least three distinct energy levels, two of which have a separation in the wave spectrum band of energies correspondent to the frequencies of interest. Pumping means wholly chemical in nature are provided for pumping the active material so that the populations of the separated energy levels are inverted from their normal relation. The pumping means generates light energy of high intensity to provide pumping energy to the active material for producing a high energy output light beam.

Referring to the drawings and in particular to FIGS. 1 and 2, there is illustrated a sectional view of a laser device according to the principles of this invention. The device includes an active material 11 shown in FIG. 1, for example, as a cylindrical rod made of ruby. The rod 11 has a pair of partially reflective silver mirrors at the ends thereof for providing the resonant structure to enhance the radiation produced in the active material 11. The end 12, for example, may have a heavy silver coat to make it an opaque mirror while the end 13 may have a silver coat to make it a partially reflecting mirror in the range of 90 to 95%. Pumping energy for the active material 11 is provided by a plurality of pumping sources 14 symmetrically disposed about the active material 11 for generating high intensity light energy to be distributed to the active material 11. Each of the pumping sources 14 is wholly chemical in nature and may comprise, for example, as shown in FIG. 1, a flash powder which is detonated upon excitation from an electrical source 15 series-connected to the pumping sources 14. The active material 11 and pumping sources 14 are suitably disposed in a holding chamber 16 which is filled with an oxidizing gas such as oxygen supplied from a gas source 17. The active material 11 may be enclosed within a protective sheet 18 of quartz or the like to cool the active material as well as provide the proper filtering of the light energy from the pumping sources 14.

In operation of the laser device of FIG. 1, the pumping sources 14 responsive to a signal from the electrical source 15 produce a chemical combustion which creates light energy which is directed through the transparent sides of the active material 11 to provide the pumping energy therefor. The characteristics of the chemical combustion of the pumping sources 14 are such that the active material 11 receives a pumping pulse with high intensity and a short rise time. The intensity of the light energy from the pumping sources 14 causes the active material 11 to produce a beam of light energy through the partially reflective end 13 of high intensity as well as possessing the well known monochromatic and coherent characteristics of an output beam from a laser.

Referring now to FIGS. 3 and 4, an aspect of the invention is illustrated in which an elliptically shaped chamber 21 encloses an active material 22 and a pumping source 23. The pumping source 23 is entirely chemical in nature and may be detonated without the use of an electrical source such as by a percussion cap. The active material 22 which may comprise a cylindrical rod of the ruby type has its axis coinciding with the focal axes of the elliptical planes transverse to the length of the chamber 21. In this manner, light energy generated by the detonation of the explosive 23 or by flash powder is focused on the active material 22 in such a manner as to provide a higher intensity light energy pumping source. The active material 22 responsive to the pumping source then produces an output beam of high intensity.

Referring now to FIG. 5, there is illustrated an aspect of the invention in which the pumping source is in the form of an explosive sheet 26 symmetrically spaced around an active material 27. Upon detonation the explosive sheet 26 provides high intensity in pumping light energy directed toward the center of the active material 27 thereby increasing the intensity of the pumping source.

In the device of FIG. 5, the chamber 28 is filled with an inert gas such as xenon or argon or any easily ionizable vapor. The detonation of the explosive 26 generates a shock wave which is directed toward the axis of the active material 27. The inwardly directed shock wave ionizes the argon or xenon molecules in the chamber 28. The ionized gas radiates high intensity light energy to the active material. In this manner a pumping pulse is received by the active material 27 of extremely high intensity and rapid rise time causing the emission of a light beam from the active material 27.

Referring now to another aspect of the invention, there is illustrated in FIG. 6 a laser 41 in which light energy for pumping is generated by the ignition of an explosive charge 42 in a shock tube 43. The tube 43 may be constructed of a tough glass material 44 with one end 51 containing the explosive charge 42 having a reinforcing barrel 45. A laser material 46, which may be a ruby rod, is centrally disposed within the tube at the other end 52 of the tube 43. A steel rod 47 connects the laser rod 46 to the end 51 of the tube 43. A gas such as xenon fills the space in the tube 43 surrounding the rod 46. Ignition of the explosive charge 42 by a primer 48 causes a shock wave to be created in the xenon gas. The shock wave propagates down to the tube 43 creating light energy which is directed to the rod 46. The inner surface of the tube 43 may be silvered to reflect the light back into the rod 46. The end 52 may comprise a blowout support which acts as a safety valve assuming that the pressure generated by the expansion in the tube 43 does not go beyond predetermined safety limits. A window 53 passes the light energy produced by the rod 46.

The shock tube pumping system of the laser of FIG. 6 generates a shock wave of high velocity which provides an extremely fast use time pulse of light energy. In FIG. 7, there is shown another method of generating a shock wave of high velocity according to the shock tube pumping system of FIG. 6. The laser 61 of FIG. 7 generates a shock wave in a tube by means of a chamber 62 filled with a gas, such as helium, which is responsive to an explosive charge 63 in the chamber. When the pressure of the gas reaches a predetermined amount, a diaphragm 64 bursts releasing a shock wave into the area surrounding the laser rod 65.

The principles of the present invention embodied in the drawings may be utilized in monochromatic lasers of the infrared, visible, or ultraviolet wave lengths. These devices are capable of amplifying or producing energy of the aforesaid wave lengths with no significant change in the wave of phase thereof. An output light beam from laser devices with high intensity may readily be focused to a point by well known optical means to provide a high intensity light source.

The output of the laser devices according to this invention may be focused by optical means to points in space over long distances with a large quantity of energy concentrated at a point. In this manner a laser radiation weapon may be readily provided which will operate at distances heretofore unattainable in the laser field.

Although the invention has been described and illustrated in detail, it is to be clearly understood that the same is by way of illustration and example only and is not taken by way of limitation, the spirit and scope of this invention being limited only by the terms of the appended claim.

I claim:

A laser for producing light at high energy levels comprising,
- a rod of active material capable of producing stimulated emission of radiation,
- said rod having end partially reflective mirrors for enhancing radiation at said frequency of interest, one of said end means being adapted to pass a light beam from said rod,
- and means for pumping said rod of active material comprising a cylindrical sheet of explosive material symmetrically spaced around said rod of active material, and including an ionizing gas surrounding said rod.

References Cited by the Examiner

Bushor, "Sun and Exploding Wires Pump Lasers," Electronics, vol. 35, No. 13, March 30, 1962, pages 24 and 25.

Conn, "The Use of 'Exploding Wires' as a Light Source of Very High Intensity and Short Duration," Journal of the Optical Society of America, vol. 41, No. 7, July 1951, pages 445 to 449.

Rechsteiner et al., Masers and Lasers, Technology Markets, Inc., New York, May 23, 1962, pages 15 and 16.

Stevenson et al., "Spectral Characteristics of Exploding Wires for Optical Maser Excitation," Journal of Applied Physics, vol. 34, No. 3, March 1963, pages 500 to 509.

Vogel et al., "Lasers: Devices and Systems," Part I, Electronics, vol. 34, No. 34, October 27, 1961, pages 40 to 47.

JEWELL H. PEDERSEN, *Primary Examiner.*